(12) United States Patent
Wang et al.

(10) Patent No.: US 11,803,023 B2
(45) Date of Patent: *Oct. 31, 2023

(54) OPTICAL MODULE AND ASSEMBLY METHOD THEREOF

(71) Applicant: InnoLight Technology PTE. LTD., Singapore (SG)

(72) Inventors: Zhanwei Wang, Jiangsu (CN); Kewu Wang, Jiangsu (CN)

(73) Assignee: INNOLIGHT TECHNOLOGY PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,076

(22) Filed: Apr. 28, 2022

(65) Prior Publication Data

US 2022/0252803 A1    Aug. 11, 2022

Related U.S. Application Data

(63) Continuation of application No. 16/376,118, filed on Apr. 5, 2019, which is a continuation of application No. 15/852,057, filed on Dec. 22, 2017, now Pat. No. 10,254,492.

(30) Foreign Application Priority Data

Jul. 19, 2017  (CN) .......................... 201710591207.4

(51) Int. Cl.
*G02B 6/42*  (2006.01)
*G02B 6/38*  (2006.01)

(52) U.S. Cl.
CPC ......... *G02B 6/4292* (2013.01); *G02B 6/3825* (2013.01); *G02B 6/428* (2013.01); *G02B 6/3897* (2013.01)

(58) Field of Classification Search
None
See application file for complete search history.

(56) References Cited

U.S. PATENT DOCUMENTS

| | | | |
|---|---|---|---|
| 5,138,679 A | 8/1992 | Edwards et al. | |
| 5,202,943 A | 4/1993 | Carden et al. | |
| 6,619,859 B1 | 9/2003 | Minamino et al. | |
| 7,116,912 B2 | 10/2006 | Pang et al. | |
| 7,350,979 B2 * | 4/2008 | Mizue ................. | G02B 6/4246 385/71 |

(Continued)

FOREIGN PATENT DOCUMENTS

| CN | 101813810 B | 7/2011 |
|---|---|---|
| CN | 104503040 A | 4/2015 |
| CN | 104246566 B | 4/2016 |

*Primary Examiner* — Omar R Rojas

(74) *Attorney, Agent, or Firm* — Finnegan, Henderson, Farabow, Garrett & Dunner, LLP

(57) ABSTRACT

An optical module includes a housing, a printed circuit board, an optical assembly, an optical interface joined with the optical assembly, the printed circuit board, the optical assembly, and the optical interface being disposed in the housing, an adapter to be mated with an external optical connector and disposed on an end of the housing, and first and second connecting part disposed on the adapter and the housing, respectively. The adapter and the housing are secured together through the first and second connecting parts. The optical interface and the adapter are configured to correspond to each other.

20 Claims, 6 Drawing Sheets

(56) References Cited

U.S. PATENT DOCUMENTS

| | | | |
|---|---|---|---|
| 7,367,720 B2 | 5/2008 | Mizue et al. | |
| 9,160,450 B2 | 10/2015 | Duis et al. | |
| 10,254,492 B2 * | 4/2019 | Wang | G02B 6/4292 |
| 10,261,270 B2 | 4/2019 | Kurashima | |
| 2013/0077978 A1 | 3/2013 | Duis et al. | |
| 2016/0041343 A1 | 2/2016 | Ho et al. | |
| 2016/0231514 A1 | 8/2016 | De Bruijn et al. | |
| 2018/0267263 A1 * | 9/2018 | Wang | G02B 6/4228 |

* cited by examiner

OPTICAL MODULE AND ASSEMBLY METHOD THEREOF

CROSS-REFERENCE TO RELATED APPLICATION

This application is a continuation of Application No. 16/376,118, filed Apr. 5, 2019 (allowed), which is a continuation application of U.S. patent application Ser. No. 15/852,057, filed Dec. 22, 2017, issued as U.S. Pat. No. 10,254,492 on Apr. 9, 2019, which is based upon and claims priority to Chinese Patent Application No. 201710591207.4, filed on Jul. 19, 2017, the entire content of all of which are incorporated herein by reference.

FIELD OF THE DISCLOSURE

The present application relates to manufacturing technology for optical communication components and, more particularly, relates to an optical module and assembly method thereof.

BACKGROUND

A typical optical module generally includes a number of components such as a housing, an optical assembly, and a circuit board. In general, during assembly of the optical module, after components inside a housing are assembled, upper and lower housing parts are secured together. For example, Chinese Patent Application No. 201310219168.7 discloses an optical module, which includes a base, a housing, a bidirectional transceivng component, and a printed circuit board. The transceiving component includes interface parts. After the entire optical module is assembled, the interface parts are disposed in two corresponding sockets. When the optical module is connected to an optical fiber connector or another connector, the connector is inserted into the sockets to be coupled with the interface parts. The relative positions of the interface parts and the sockets are required to be fixed with a high degree of precision after the optical module is assembled and installed. Otherwise, imprecise alignment, difficulty in inserting and removing the connector, and electromagnetic leakage are likely to occur.

SUMMARY

Consistent with the present disclosure, there is to provided an optical module and assembly method thereof that allow for easy insertion and removal of an external optical connector into and from an adapter of the optical module, and allow convenient assembly of the module.

According to one aspect of the present disclosure, an optical module includes a housing, and a printed circuit board, an optical assembly, and an optical interface disposed in the housing. The optical interface is connected with the optical assembly. An adapter to be mated with an external optical connector is disposed on an end of the housing. First and second connecting parts are disposed on the adapter and the housing, respectively. The adapter and the housing are fixed together through the first and second connecting parts. The optical interface and the adapter are configured to correspond to each other.

According to another aspect of the present disclosure, there is provided a method for assembling the optical module described above. The assembly method includes assembling the optical assembly and the printed circuit board inside the housing, assembling the adapter on the housing, adjusting a position of the adapter relative to the housing according to a position of the optical interface, and fixing the adapter and the housing together after the position of the adapter is adjusted.

DETAILED DESCRIPTION

Figure 1:
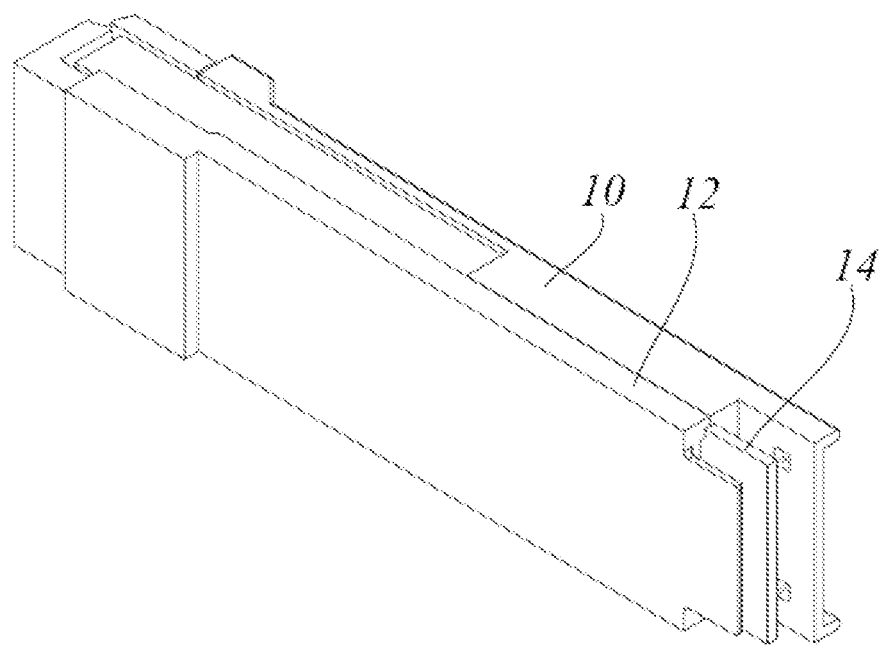
FIG. 1 is a perspective view of an optical module according to a first exemplary embodiment of the present disclosure.
Figure 2:
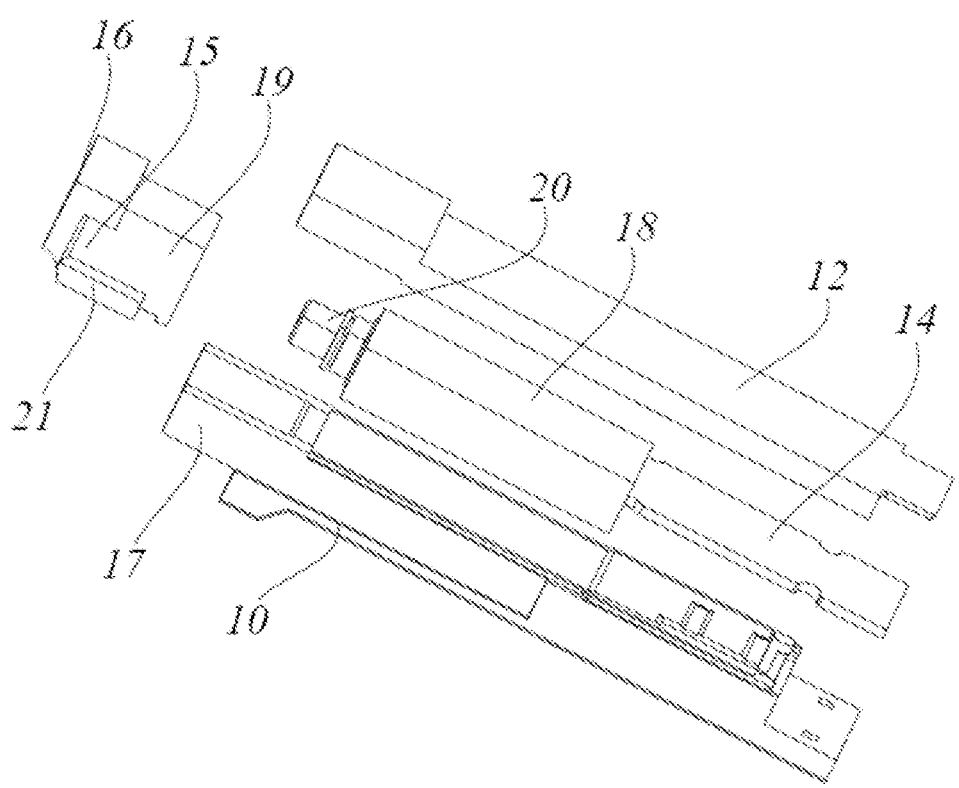
FIG. 2 is a perspective exploded view of the optical module according to the first exemplary embodiment of the present disclosure.
Figure 3:
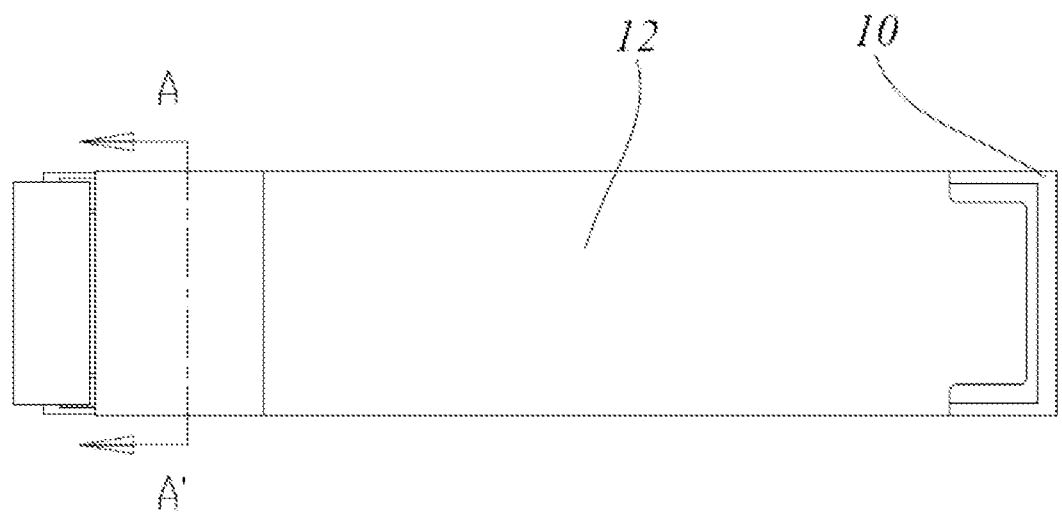
FIG. 3 is a front view of the optical module in FIG. 1.
Figure 4:
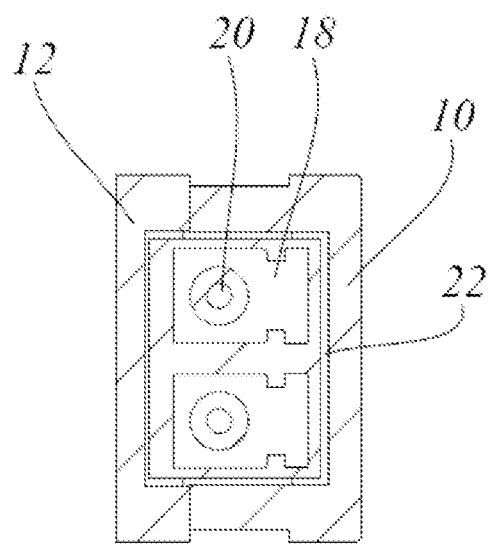
FIG. 4 is a cross-sectional view of the optical module in FIG. 3 across line A-A'.

Following is a detailed description of specific embodiments as shown in the attached drawings. However, these embodiments do not limit the invention; the scope of protection for the present invention covers changes made to the structure, method, or function by persons of ordinary skill in the art based on the embodiments.

Additionally, terms in the text indicating relative spatial position, such as "upper," "above," "lower," "below," and so forth, are used for explanatory purposes in describing the relationship between a unit or feature depicted in a drawing with another unit or feature therein. Terms indicating relative spatial position can refer to positions other than those depicted in the drawings when a device is being used or operated. For example, if the device shown in a drawing is flipped over, a unit which is described as being located "below" or "under" another unit or feature will be located "above" the other unit or feature. Therefore, the exemplary term "below" can include positions both above and below. A device can be oriented in other ways (rotated 90 degrees or facing another direction); as such, descriptive spatially-related terms that appear in the text should be interpreted accordingly.

When a component or layer is said to be "above" another part or layer or "connected to" another part or layer, it may be directly above the other part or layer or directly connected to the other part or layer, or there may be an intermediate element(s) or layer(s). Conversely, when a part is said to be "directly above another part or layer" or "directly connected to another part or layer," there cannot be any intermediate parts or layers.

FIGS. 1 through 4 disclose an optical module according to a first exemplary embodiment of the present disclosure. In the first embodiment, the optical module includes a housing and a printed circuit board 14 that is disposed inside the housing. The housing includes an upper housing 10 and a lower housing 12. The printed circuit board 14 is clipped into an inner wall of the housing. Alternatively, screws and other methods can be employed to secure the printed circuit board 14 inside the housing. An electrical chip is disposed on the printed circuit board 14. In addition, a laser, a photoelectric detector, or other optic-related chips may also be disposed on the printed circuit board 14. A prism, a wavelength division multiplexer, or other optical components may also be secured to the printed circuit board to accommodate requirements.

An adapter 16 to be mated with an external optical connector (not shown) is disposed on an end of the housing. First and second connecting parts are disposed on the adapter 16 and the housing, respectively. The adapter 16 and the housing are secured together through the first and second connecting parts. The adapter 16 and the housing are separated from each other prior to assembly. The adapter 16 is at least partially contained inside the housing. Here, the external optical connector refers to a connector that transmits optical signals, such as an optical fiber connector.

The optical module also includes an optical assembly 18 and an optical interface 20 that are disposed inside the housing. The optical interface 20 is connected with the optical assembly 18. The optical assembly 18 includes a transmitter optical subassembly and a receiver optical subassembly. The optical interface 20 and the adapter 16 are configured to correspond to each other. The optical interface 20 is mated with the adapter 16. The adapter 16 can have one or two sockets. Correspondingly, the optical interface 20 can have one or two interfaces. The socket may be a standard socket that conforms to the standards of the optical communications industry or a non-standard socket that is made to order.

A gap 22 exists between the adapter 16 and the housing before they are secured together. The gap 22 is provided for adjusting a position of the adapter 16 relative to the housing. As a result, the adapter 16 can be conveniently moved to a suitable position relative to the housing before the adapter 16 is fixed in the housing. The optical assembly 18 can be fixed to the printed circuit board 14 as a whole. Alternatively, components of the optical assembly 18 can be secured to a carrier, and the carrier is partially fixed to the printed circuit board 14. The optical assembly 18 is electrically connected to the printed circuit board 14. When an external optical fiber connector is plugged into the optical module through the adapter 16, an interface of the optical fiber connector is mated with the optical interface 20 to form an optical path. The interface of the optical fiber connector can be inserted to or removed from the optical interface 20 smoothly. As a result, an interaction between an inner wall of the adapter 16 and the optical fiber connector will neither cause the insertion and removal of the interface of the optical fiber connector to be overly tight, nor cause the optical path to experience poor coupling. Under normal circumstances, an axis of the optical interface 20 and a center of the one or two sockets of the adapter 16 are aligned along the same straight line.

In the first embodiment, the first and second connecting parts are disposed on the adapter 16 and the housing, respectively. The adapter 16 and the housing are secured together through the first and second connecting parts, eliminating the difficulty of inserting and removing the external optical connector into and from the adapter 16 due to manufacturing tolerance of the adapter 16 and/or the housing. By transforming the manufacturing tolerance of the adapter 16 and/or housing into a position tolerance of the adapter 16, the adapter 16 can be moved relative to the housing according to a position of the external optical connector, thus allowing for easy insertion and removal of the external optical connector into and from the adapter 16, and allowing convenient assembly.

The first connecting part disposed on the adapter 16 includes an adapter sidewall 19 located at an end of the adapter 16. The second connecting part disposed on the housing includes a housing sidewall 17 located at an end of the housing. One of the adapter sidewall 19 and the housing sidewall 17 can be inserted along an exterior of the other one of the adapter sidewall 19 and the housing sidewall 17, and then the adapter sidewall 19 and the housing sidewall 17 can be secured together. Specifically, in the first embodiment, the housing sidewall 17 is inserted along the exterior of the adapter sidewall 19.

Further, a protruding part 21 can be disposed on one of the first connecting part disposed on the adapter 16 and the second connecting part disposed on the housing. The protruding part 21 restricts the movement range of the other one of the first and second connecting parts relative to the one of the first and second connecting parts. The height of the portion of the protruding part 21 that protrudes from the one of the first and second connecting parts is not less than the thickness of the wall of the other one of the first and second connecting parts to which the one of the first and second connecting parts is connected. Specifically, in the first embodiment illustrated in FIG. 2, the protruding part 21 is disposed on the first connecting part disposed on the adapter 16. The height of the protruding part 21 that protrudes from the first connecting part is not less than the thickness of the wall of the second connecting part disposed on the housing to which the first connecting part is connected. The protruding part 21 restricts the movement range of the housing, thus facilitating the movement of the housing within a predetermined range during assembly, functioning as an initial limit, and enabling stronger bonding. In the first embodiment illustrated in FIG. 2, the housing sidewall 17 is inserted along the exterior of the adapter sidewall 19, and the protruding part 21 is positioned on the periphery of the housing sidewall 17. Further, the protruding part 21 is configured on the adapter sidewall 19. A receiving port 15 is formed by the protruding part 21 and the adapter sidewall 19, and the housing sidewall 17 does not protrude from the receiving port 15. In other words, the second connecting part disposed on the housing does not protrude from the first connecting part disposed on the end of the adapter 16.

Alternatively, the protruding part 21 can be configured on the second connecting part disposed on the housing, and the height of the portion of the protruding part 21 that protrudes from the second connecting part is not less than the thickness of the wall of the first connecting part disposed on the adapter 16. In this scenario, the sidewall 19 on the end of the adapter 16 is inserted along the exterior of the sidewall 17 on the end of the housing, and the protruding part 21 is positioned on the periphery of the sidewall 19 on the end of the adapter 16.

Before the adapter 16 is fixed to the housing, the adapter 16 can move left, right, up, or down relative to the housing, thus enabling the position of the adapter 16 to be adjusted. The adapter 16 and the housing are fixed together after the adapter 16 is adjusted to the desired position. In the first embodiment illustrated in FIG. 2, the housing sidewall 17 is located on the upper housing 10.

One end of the adapter 16 is mated with the external optical connector, and the other end of the adapter 16 is mated with the optical assembly 18. The adapter 16 includes two adapter sidewalls 19, a top wall, and a bottom wall. A socket is formed by the two adapter sidewalls 19, the top wall, and the bottom wall. A partition wall is disposed in the middle of the adapter 16, The socket of the adapter 16 can be divided into two by the partition wall to form two sockets.

In the first embodiment, the optical interface 20 connected with the optical assembly 18 is configured as two optical interfaces: one optical interface 20 is a transmitter-end optical interface and the other optical interface 20 is a receiver-end optical interface. Alternatively, the two optical interfaces 20 can both be transmitter-end optical interfaces or receiver-end optical interfaces.

The adjustment gap 22 exists between an end surface of the adapter 16 that is parallel to an insertion direction of the optical interfaces 20, and the upper housing 10, and between the end surface of the adapter 16 and the lower housing 12. Thus, when the adapter 16 is assembled, the adapter 16 can move in a plurality of directions, such as up, down, right, or left, according to the position of the optical assembly 18.

In the first exemplary embodiment, glue is dispensed between the adapter 16 and the housing to fix the adapter 16 and housing together. Alternatively, other securing methods, such as screws, can be employed to fix the adapter 16 and the housing together.

The present disclosure also discloses an assembly method for the aforementioned optical module. The assembly method includes the following steps: a. the optical assembly 18 and the printed circuit board 14 are assembled inside the housing; b. the adapter 16 is assembled on the housing; c. the position of the adapter 16 relative to the housing is adjusted according to the position of the optical interface 20; and d. the adapter 16 and the housing are fixed together after the adapter 16 is adjusted to a desired position. The desired position refers to a position when the optical interface 20 and the adapter 16 correspond to each other. When fixing the adapter 16 and the housing together, glue can be dispensed to fix the adapter 16 and the housing together. Other securing methods, such as screws, can also be employed to fix the adapter 16 and the housing together. When screws are employed as the securing method, spacers (not shown) having corresponding thickness can be inserted into the gap 22 between the adapter 16 and the housing.

Further, in Step b, the adapter 16 is assembled on the lower housing 12 first, and then the upper housing 10 and the lower housing 12 are secured together. Alternatively, in Step b, the upper housing 10 and the lower housing 12 can be fixed together first, and then the adapter 16 and the housing can be fixed together. Specifically, the adapter 16 and the lower housing 12 can be fixed together.

In Step b, the adapter 16 and the housing are connected through the first and second connecting parts. Specifically, the adapter 16 is inserted onto the upper housing 10. The receiving port 15 on the adapter 16 is mated with the sidewall 17 on the upper housing 10. A gap exists between the receiving port 15 and the sidewall 17. The relative position between the adapter 16 and the upper housing 10 can be adjusted to accommodate specific requirements. After the proper adjustment, glue can be dispensed between the receiving port 15 and the sidewall 17 to fix the receiving port 15 and the sidewall 17 together.

Moreover, in Step b, the optical assembly 18 needs to be inserted into the adapter 16 when the adapter 16 is being assembled on the housing. The insertion of the optical assembly 18 into the adapter 16 can be controlled by a person. Additional positioning fixtures can be employed for positioning while assembling the optical assembly 18 and the adapter 16 together. Further, an optical connector or another component can be inserted into the socket of the adapter 16 to restrict the movement of the adapter 16 when the adapter 16 is being fixed, thus restricting the adapter 16 to a suitable position. Then glue is dispensed to fix the adapter 16 and the housing together. The optical connector can be removed after the adapter 16 and the housing are properly secured.

When an optical assembly and a PCB are secured together to form a rigid connection, the center of an optical path of the optical assembly is fixed relative to the housing. Because of accumulated production tolerances and assembly tolerances, the center of the adapter may not be consistent with the center of the optical path of the optical assembly secured to the PCB. According to the first embodiment of the present disclosure, with the separation of the adapter and the housing, accumulated tolerances can be well absorbed, and the adapter is fixed to the housing after the center of the adapter is adjusted to be aligned with the center of the optical path of the optical assembly on the PCB. As a result, the effects of accumulated tolerances are eliminated. Problems arising from the large displacement of the position of the PCB, such as inability to assemble the optical fiber connector or tight insertion and removal of the optical fiber connector after assembly, are also resolved.

Figure 5:
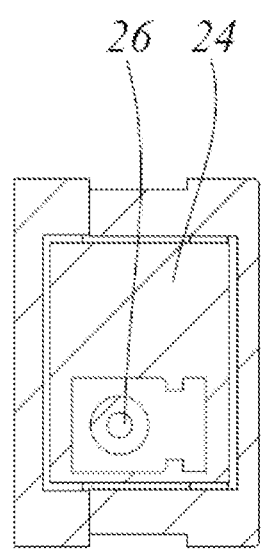
FIG. 5 is a cross-sectional view of an optical module according to a second exemplary embodiment of the present disclosure.

FIG. 5 illustrates an optical module according to a second exemplary embodiment of the present disclosure. The second exemplary embodiment differs from the first embodiment in that an optical interface 26 connected with an optical assembly 24 has only one interface. Correspondingly, an adapter for the optical assembly 24 has only one socket. In the second embodiment, the optical interface 26 is configured as a transceiver optical interface. Alternatively, the optical interface 26 can be configured as a transmitter optical interface or a receiver optical interface. The rest of the second exemplary embodiment is identical to the first exemplary embodiment and thus a detailed description thereof will not be repeated.

Figure 6:
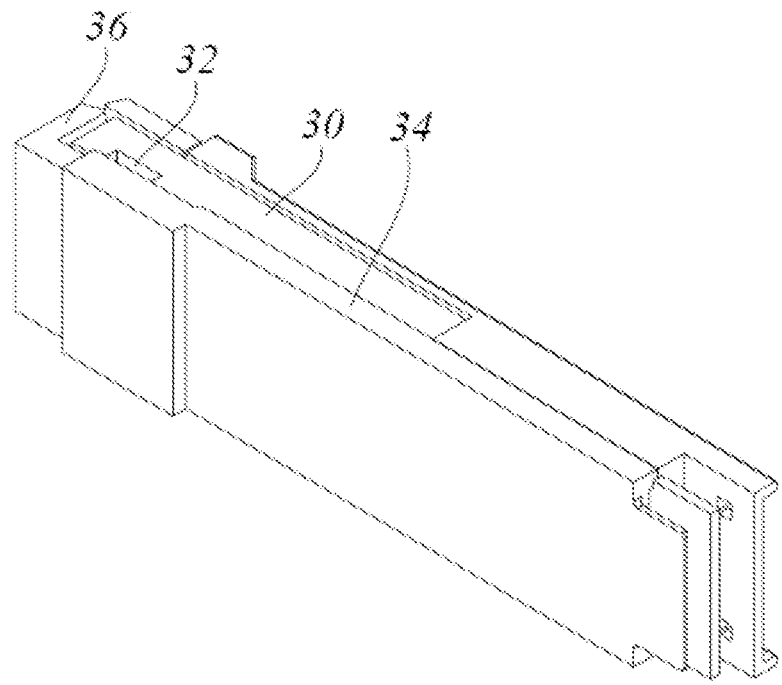
FIG. 6 is a perspective view of an optical module according to a third exemplary embodiment of the present disclosure.
Figure 7:
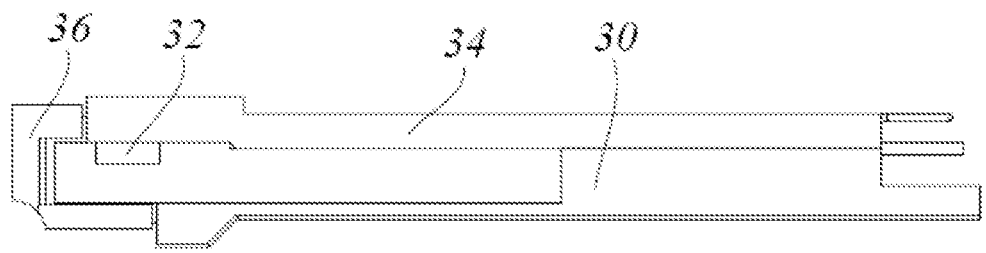
FIG. 7 is a front view of the optical module in FIG. 6.
Figure 8:
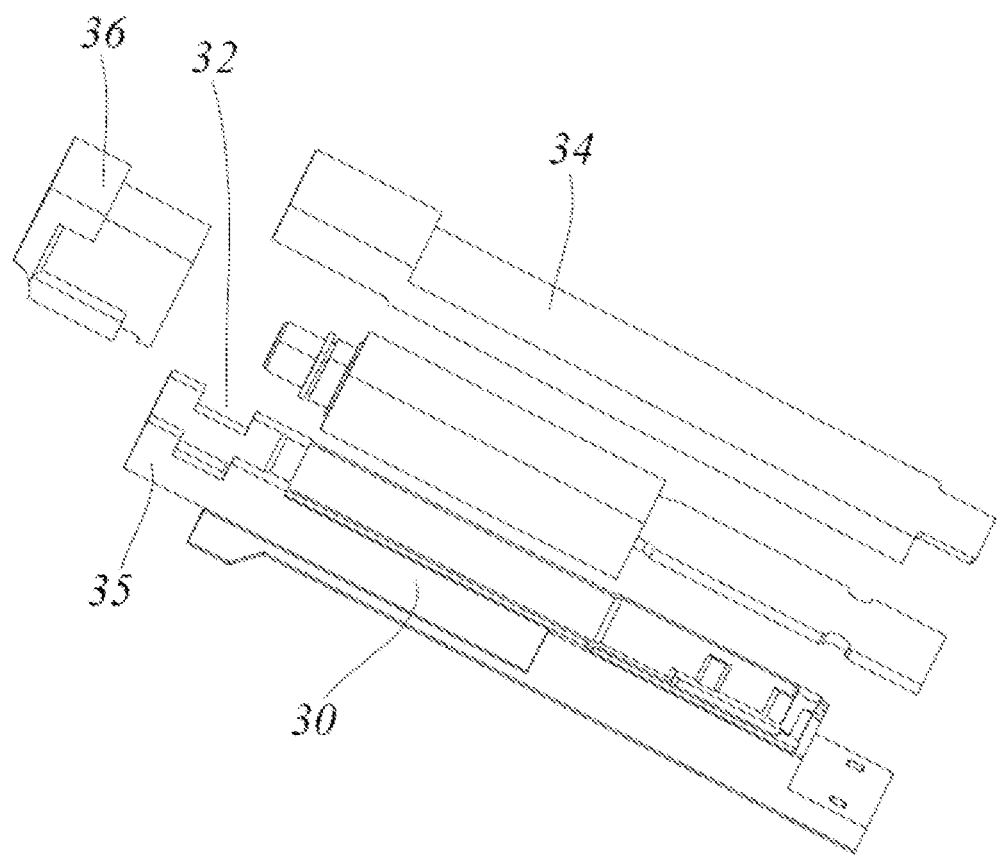
FIG. 8 is a perspective exploded view of the optical module according to the third exemplary embodiment of the present disclosure.

FIGS. 6 through 8 illustrate an optical module according to a third exemplary embodiment of the present disclosure. The third exemplary embodiment differs from the first exemplary embodiment in that a notch 32 is disposed on one of a first connecting part disposed on an adapter 36 and a second connecting part disposed on a housing which includes a lower housing 30 and an upper housing 34. An inside of the notch 32 is filled with fixing glue that fixes the first connecting part disposed on the adapter 36 and the second connecting part disposed on the housing. In the third exemplary embodiment illustrated in FIGS. 6 through 8, the notch 32 is disposed on the second connecting part disposed on the housing. More specifically, the notch 32 is disposed on a sidewall 35 of the housing. The inside of the notch 32 is filled with fixing glue after the housing and the adapter 36 are inserted together, thus allowing the adapter 36 and the housing to be more firmly secured.

An opening direction of the notch 32 is perpendicular to an insertion direction of the housing relative to the adapter 36. Specifically, the notch 32 is located on the lower housing 30, and the opening direction of the notch 32 is oriented toward the upper housing 34. In the third exemplary embodiment illustrated in FIGS. 6 through 8, the notch 32 has a U shape. Alternatively, the shape of the notch 32 can be configured as an L shape, circle, oval, polygon, or other shapes.

The optical module according to the third exemplary embodiment can include two notches 32. The two notches 32 can be symmetrically disposed on two sides of the adapter 36. Alternatively, the two notches 32 can be asymmetrically disposed. Moreover, the openings of the notches 32 can be configured to be oriented away from the upper housing 34. In other words, the notches 32 can be configured on the side of the lower housing 30 that is away from the upper housing 34. The other parts of the third exemplary embodiment are identical to those in the first exemplary embodiment and thus a detailed explanation thereof will not be repeated.

In the third exemplary embodiment, when the adapter 36 is assembled onto the housing, glue is dispensed in the notches 32 after the adapter 36 is adjusted to a desired position, thus securing the adapter 36 and the housing together.

Figure 9:
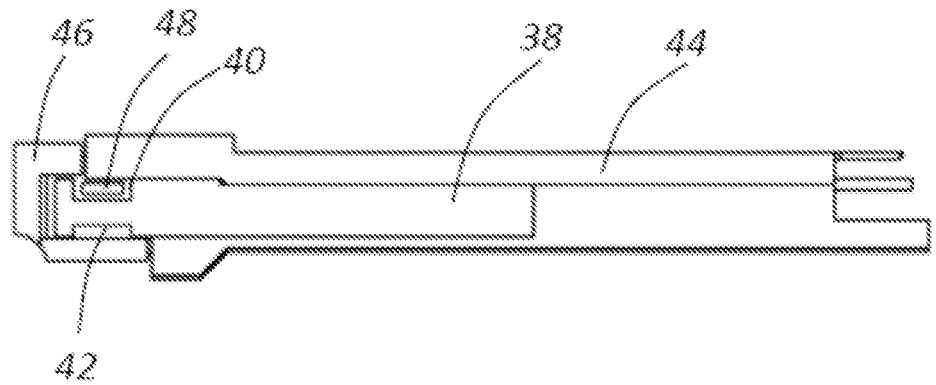
FIG. 9 is a front view of an optical module according to a fourth exemplary embodiment of the present disclosure.
Figure 10:
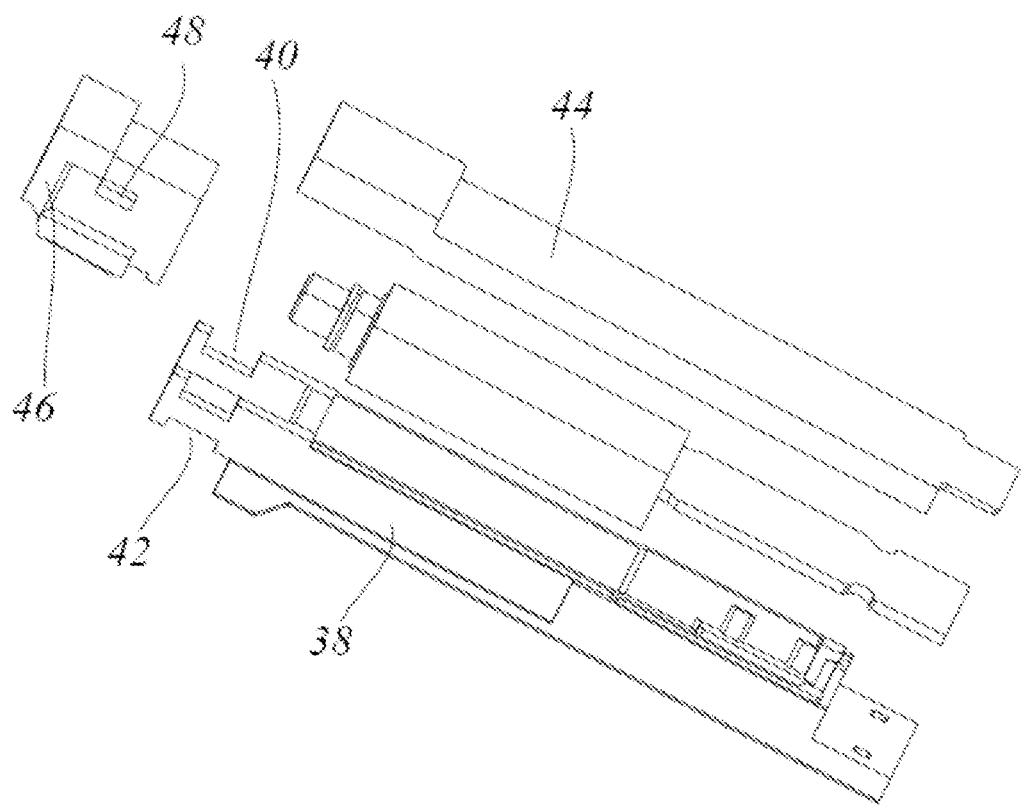
FIG. 10 is a perspective exploded view of the optical module according to the fourth exemplary embodiment of the present disclosure.

FIGS. 9 and 10 illustrate an optical module according to a fourth exemplary embodiment of the present disclosure. The fourth exemplary embodiment differs from the third exemplary embodiment in that a first notch 40 and a second notch 42 are disposed on a connecting part of a housing including an upper housing 44 and a lower housing. The first notch 40 and the second notch 42 are both used for filling the fixing glue between the housing and an adapter 46. Specifically, the first notch 40 and the second notch 42 are configured on a sidewall 38 of the housing. Alternatively, the first notch 40 and the second notch 42 can also be configured on a connecting part of the adapter 46. Similarly, the first notch 40 and the second notch 42 can be configured on sidewalls of the adapter 46.

In the fourth exemplary embodiment, opening directions of the second notch 42 and the first notch 40 are oriented in opposite directions. Specifically, the opening of the first notch 40 is oriented toward the upper housing 44, and the opening of the second notch 42 is oriented away from the upper housing 44.

The optical module according to the fourth exemplary embodiment can include two first notches 40. The two first notches 40 can be symmetrically located on two sides of the adapter 46. Similarly, the optical module can include two second notches 42. The two second notches 42 can also be symmetrically located on two sides of the adapter 46. Alternatively, the two first notches 40 can be asymmetrically disposed. Similarly, the two second notches 42 can also be asymmetrically disposed.

In the fourth exemplary embodiment, when the adapter 46 is assembled onto the housing, glue is dispensed into the first notches 40 and the second notches 42 after the adapter 46 is adjusted to a desired position, thus fixing the adapter 46 and the housing together, and allowing the adapter 46 and the housing to be more firmly secured.

Further, a protruding part 48 is disposed on a first connecting part of the adapter 46. Alternatively, the protruding part 48 can be disposed on a second connecting part of the housing. The protruding part 48 is at least partially located in the first notch 40, and the gap between the protruding part 48 and the first notch 40 is filled with fixing glue, thus the adapter 46 is further secured. The protruding part 48 can be symmetrically configured as two protruding parts 48, and the two protruding parts 48 are located in the two first notches 40, respectively. The other parts of the fourth exemplary embodiment are identical to the first exemplary embodiment and thus a detailed description thereof will not be repeated.

In other exemplary embodiments, the shape and number of notches and protruding parts can be adjusted to accommodate various requirements. For example the shape of the notches and protruding parts can be an L shape, circle, oval, U shape, polygon, or other shapes. The present disclosure does not restrict the shape or number of notches and protruding parts, nor does it restrict their position on the sidewalls. Notches and protruding parts can have one-to-one or multiple-to-one correspondence. It should be noted that although protruding parts and notches may complement each other in mating, they are by no means tightly mated. This enables the position of the adapter relative to the housing to be fine-tuned and then mutually secured after being adjusted to the desired position. Thus, an optical fiber connector and an optical interface of the optical assembly may be perfectly mated. The issue of the optical fiber connector being too tight during insertion and removal is avoided.

Compared to currently available technology, the embodiments of the present disclosure provide the following benefits. The adapter and the housing are secured together through the first and second connecting parts, eliminating the difficulty of inserting and removing an external optical connector into and from the adapter due to the manufacturing tolerance of the adapter and/or the housing. By transforming the manufacturing tolerance of the adapter and/or housing into the position tolerance of the adapter, the adapter can be moved relative to the housing to be aligned with the position of the external optical connector, thus allowing for the easy insertion and removal of the external optical connector into and from the adapter, and allowing convenient assembly of the optical module.

It should be understood that despite the descriptions of embodiments in the specification, each embodiment does not entail only one single independent technical solution. The specification is written this way simply for the sake of clarity. Those skilled in the art should treat the specification as a whole; the technical solutions associated with the embodiments may be combined in appropriate ways to form other embodiments that can be understood by those skilled in the art.

The series of detailed descriptions above is only intended to provide specific descriptions of feasible embodiments of the present disclosure. The detailed descriptions are not to be construed as limiting the scope of protection for the present disclosure; all equivalent embodiments or changes that are not detached from the techniques of the present disclosure in essence should fall under the scope of protection of the present disclosure.

What is claimed is:

1. An optical module, comprising:
   a housing;
   a printed circuit board disposed in the housing;
   an optical assembly disposed in the housing;
   an optical interface connected with the optical assembly;
   an adapter, to be mated with an external optical connector, disposed on an end of the housing; and
   first and second connecting parts disposed on the adapter and the housing, respectively,
   wherein the adapter and the housing are fixed together through the first and second connecting parts,
   the optical interface and the adapter are configured to correspond to each other,
   a fixing glue is filled in between the first and second connecting parts to fix the adapter and the housing together, and
   a gap exists between the adapter and the optical interface, the optical interface being spaced apart from the adapter by the gap and being fixed to the housing, the gap being used for moving the adapter left, right, up, or down relative to the housing to adjust a position of the adapter relative to the optical interface before the adapter is fixed to the housing and while the optical interface is fixed to the housing.

2. The optical module of claim 1, wherein the adapter and the housing are fixed together through the first and second connecting parts directly.

3. The optical module of claim 1, wherein the first connecting part comprises an adapter sidewall,
the second connecting part comprises a housing sidewall located at an end of the housing, and
one of the adapter sidewall and the housing sidewall is inserted along an exterior of the other one of the adapter sidewall and the housing sidewall.

4. The optical module of claim 3, wherein
the adapter sidewall and the housing sidewall are parallel to each other and extend along an insertion direction of the one of the adapter sidewall and the housing sidewall.

5. The optical module of claim 3,
wherein the gap between the adapter and the optical interface is a first gap,
a second gap exists between the adapter sidewall and the housing sidewall, and
the fixing glue is filled in the second gap between the adapter sidewall and the housing sidewall to fix the adapter sidewall and the housing sidewall together.

6. The optical module of claim 5, wherein
the first connecting part comprises two adapter sidewalls opposite to each other,
the second connecting part comprises two housing sidewalls opposite to each other, and
at least a portion of the two adapter sidewalls is inside of the two housing sidewalls.

7. The optical module of claim 5, wherein one of the adapter sidewall and the housing sidewall includes a protruding part that is configured to restrict a movement range of the other one of the adapter sidewall and the housing sidewall.

8. The optical module of claim 5, wherein one of the adapter sidewall and the housing sidewall includes a notch through which the fixing glue is disposed.

9. The optical module of claim 8, wherein
the other one of the adapter sidewall and the housing sidewall includes a protruding part, and
the protruding part is at least partially located in the notch.

10. The optical module of claim 8, wherein the notch is shaped as an L, circle, oval, U, or polygon.

11. An optical module, comprising:
a housing;
a printed circuit board, an optical assembly, and an optical interface disposed in the housing, the optical interface being coupled to the optical assembly; and
an adapter for coupling with an external optical connector and secured at an end of the housing,
wherein the adapter includes a first connecting part, the housing includes a second connecting part, and the adapter is secured at the end of the housing through the first connecting part and the second connecting part,
wherein a first gap exists between the housing and the adapter,
at least a portion of the first gap is filled by a filler to secure the housing and the adapter, and
a second gap exists between the adapter and the optical interface, the optical interface being spaced apart from the adapter by the second gap and being fixed to the housing, and the second gap being used for moving the adapter left, right, up, or down relative to the housing to adjust a position of the adapter relative to the optical interface before the adapter is secured to the housing and while the optical interface is fixed to the housing.

12. The optical module of claim 11, wherein the filler is glue.

13. The optical module of claim 11, wherein
a position of the adapter relative to the housing is fixed, after the position of the adapter relative to the optical interface is fixed.

14. The optical module of claim 11, wherein
the first gap is used for adjusting a position of the adapter relative to the housing before the adapter is secured to the housing and while the position of the optical interface relative to the housing is fixed.

15. The optical module of claim 14, wherein
the second gap defines a position of the adapter relative to the optical interface.

16. The optical module of claim 15, wherein
the adapter partly overlaps with and is secured to a sidewall of the housing after assembly.

17. The optical module of claim 16,
wherein an area of an overlapping portion between the adapter and the sidewall of the housing is less than an area of the sidewall of the housing.

18. The optical module of claim 11, wherein the first connecting part comprises an adapter sidewall,
the second connecting part comprises a housing sidewall located at an end of the housing,
one of the adapter sidewall and the housing sidewall is inserted along an exterior of the other one of the adapter sidewall and the housing sidewall.

19. The optical module of claim 18, wherein
one of the adapter sidewall and the housing sidewall includes a notch through which a fixing glue is disposed.

20. The optical module of claim 19, wherein the other one of the adapter sidewall and the housing sidewall includes a protruding part, and
the protruding part is at least partially located in the notch.

* * * * *